No. 678,144. Patented July 9, 1901.
R. W. THOMPSON.
CARRIAGE STEERING MECHANISM.
(Application filed Sept. 17, 1900.)
(No Model.) 3 Sheets—Sheet 1.

Witnesses.
Edward T. Wray.
Edgar L. Conant.

Inventor.
Rob.<sup>t</sup> W. Thompson
by Burton & Burton
his Atty's.

No. 678,144. Patented July 9, 1901.
R. W. THOMPSON.
CARRIAGE STEERING MECHANISM.
(Application filed Sept. 17, 1900.)
(No Model.) 3 Sheets—Sheet 2.

Witnesses.
Edward T. Wray.
Edgar L. Conant.

Inventor.
Robt. W. Thompson
by Burton Burton
his Atty's.

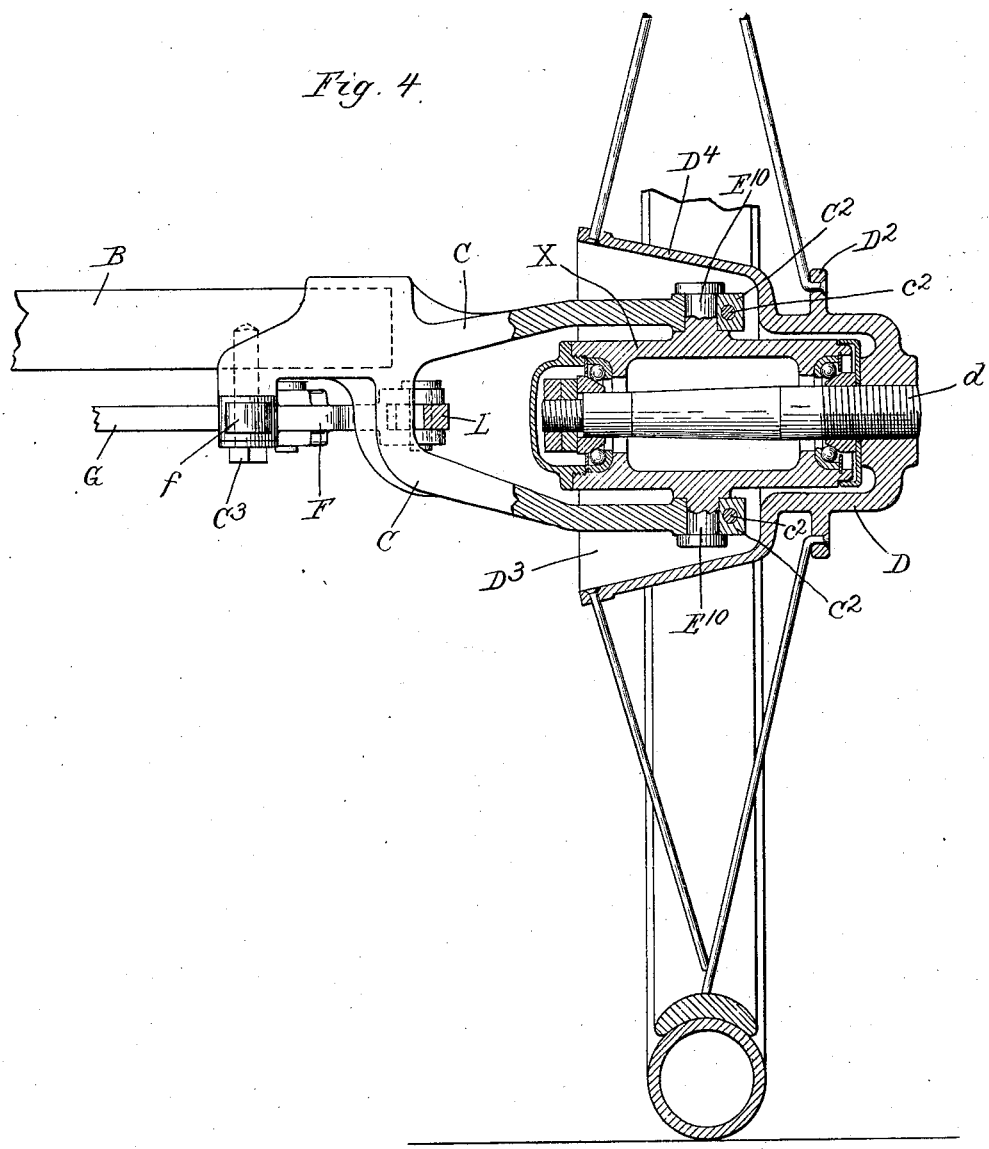

UNITED STATES PATENT OFFICE.

ROBERT W. THOMPSON, OF CHICAGO, ILLINOIS, ASSIGNOR TO THOMAS B. JEFFERY, OF SAME PLACE.

CARRIAGE-STEERING MECHANISM.

SPECIFICATION forming part of Letters Patent No. 678,144, dated July 9, 1901.

Application filed September 17, 1900. Serial No. 30,230. (No model.)

*To all whom it may concern:*

Be it known that I, ROBERT W. THOMPSON, a subject of the Queen of Great Britain, residing at Chicago, in the county of Cook and State of Illinois, have invented certain new and useful Improvements in Carriage-Steering Mechanism, of which the following is a specification, reference being had to the accompanying drawings, forming a part thereof.

Figure 1:
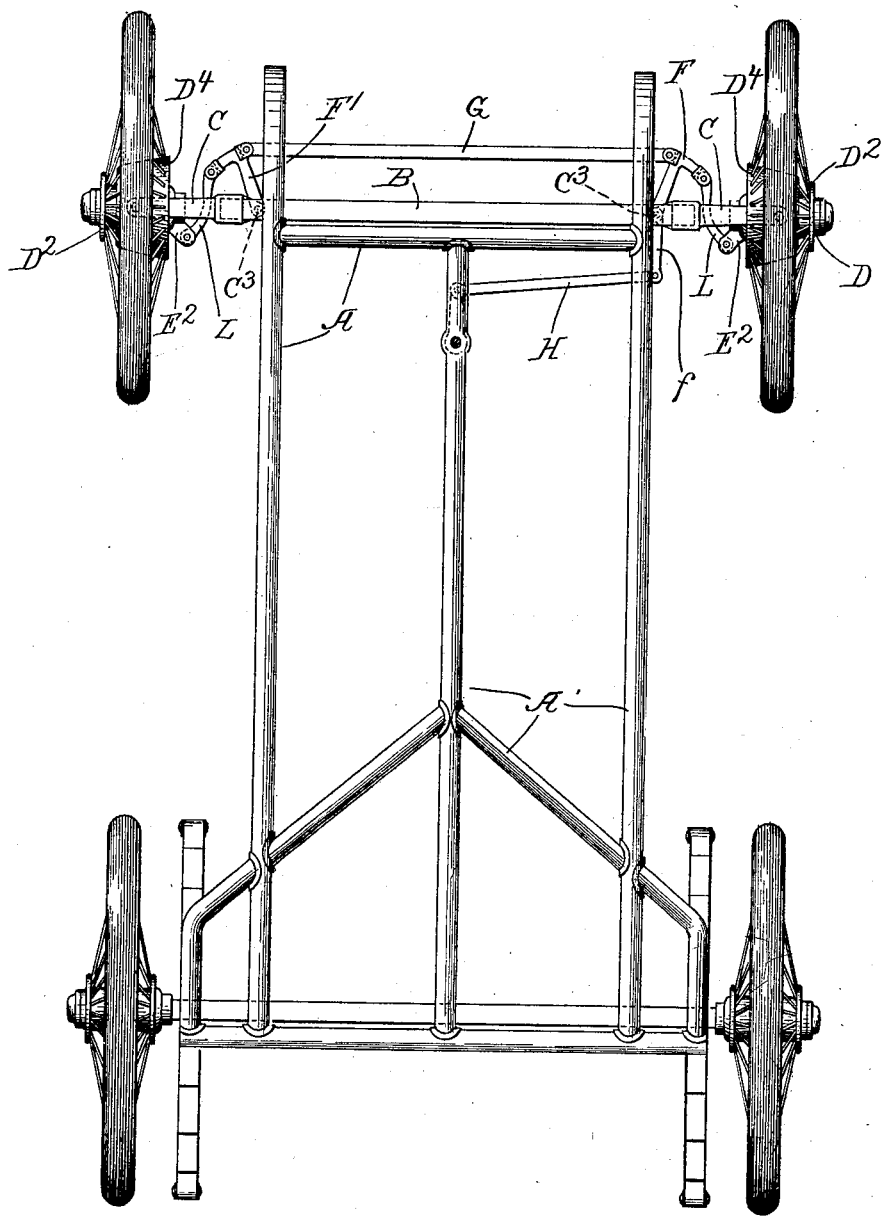
Figure 3:
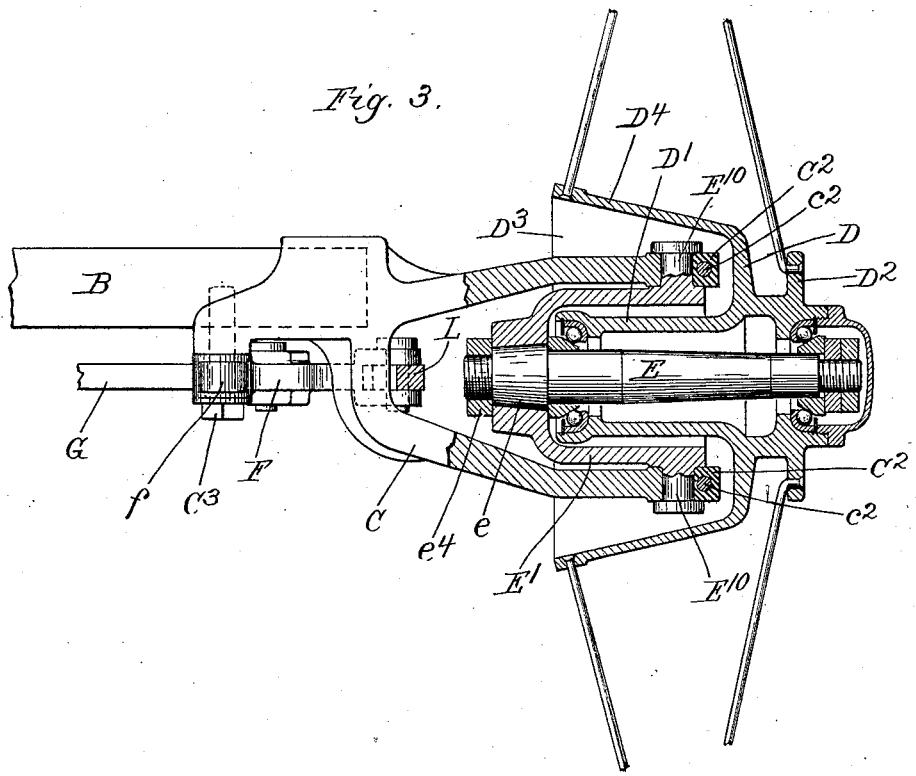
Figure 2:
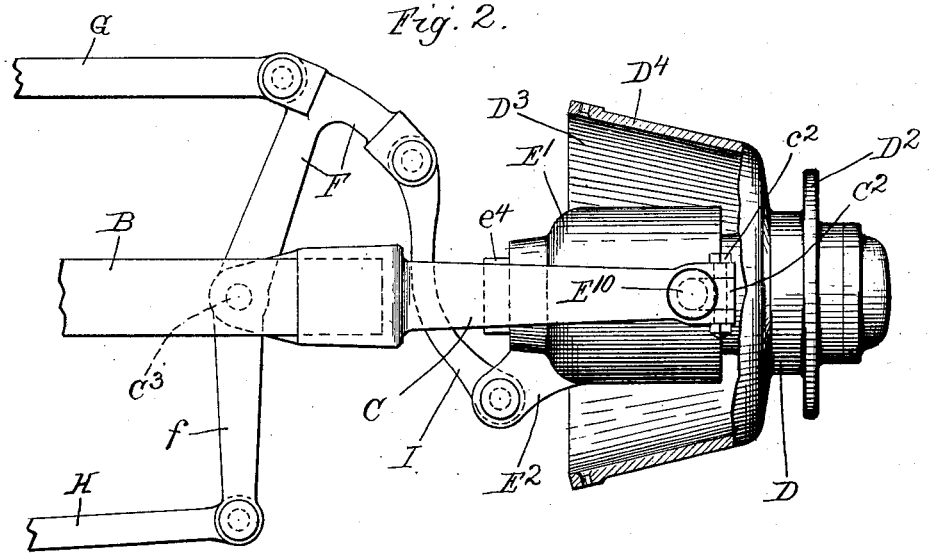

In the drawings, Figure 1 is a plan of a carriage-frame having my improved steering mechanism. Fig. 2 is a detail plan of the steering devices associated with one wheel, the hub of which is shown partly broken away to disclose the interior features. Fig. 3 is a partly-sectional side elevation of the structure shown in Fig. 2, section being made in a vertical plane through the axis of the spindle. Fig. 4 is a view similar to Fig. 3, showing a modification.

A A A, &c., are rigid bars of the rigid frame of a carriage and may stand for any form of rigid frame to which my steering devices may be applied.

B is a bar which may be termed the "axle-bar," at the opposite ends of which the steering-wheels are carried. To the extremities of this bar there are secured the wheel-carrying arms, respectively, C C. The two wheels are formed precisely alike, and a description of either will suffice for both. I have shown a suspension-wheel—that is, a wheel having spokes strained from the opposite ends of the hub convergent to the felly. The peculiarity of the wheel consists in the structure of the hub D. This hub is formed with a central portion $D'$, having ball-bearings on the spindle E, a flange $D^2$ at one end for the attachment of the spokes at that side, and a wide annular recess $D^3$, leading in from the other side past the plane of the tread and intervening between the central portion $D'$ and a flaring flange $D^4$, to which at the margin the spokes at the opposite side are attached. The wheel-bearing element as illustrated comprises the spindle E, above mentioned, and an extension of the same, which, however, for convenience is made in a separate piece and is made rigid with the spindle, as hereinafter explained. This extension $E'$ springs from the spindle E near the inner end of the latter and extends back toward the other end of the spindle at a sufficient distance therefrom to admit the central element $D'$ of the hub D onto the spindle and between the same and the extension $E'$ of said spindle. Preferably the extension $E'$ is in the form of a cup or bell encompassing the spindle throughout the longitudinal extent of said cup or bell, which is sufficient to adapt it to have pivots $E^{10}$ $E^{10}$ in the plane of the tread of the wheel, to which the wheel-carrying arm G is pivoted, said arm being preferably, as illustrated, forked, so that it strides endwise the entire wheel-bearing element, comprising the spindle and its extension, the two fork-arms both entering the recess $D^3$ of the hub and being pivoted, respectively, to the pivots $E^{10}$ $E^{10}$ on the extension $E'$ of the wheel-bearing element. When the parts are thus assembled, the axis of the pivots $E^{10}$ $E^{10}$ is vertical through the axis of the spindle, and being in the plane of the tread of the wheel the latter, turning about such pivot, turns also about the point at which it rests upon the ground, thus avoiding any side swing or drag sidewise of the wheel upon the ground in the steering action. For the purpose of giving the steering movement the wheel-bearing element has a horizontal lever-arm $E^2$. When said wheel-bearing element is constructed, as herein described, with the spindle and the extension $E'$, this lever-arm $E^2$ projects from the extension $E'$, as seen in the drawings. Levers F F' are provided with rigid fulcrums on the wheel-carrying frame, such fulcrums being most conveniently and desirably made on the wheel-carrying arms C C, respectively, as seen at $C^3$ $C^3$. A link G connects the levers F and F' from side to side of the vehicle, so that the two levers operate together. The lever F is extended past its fulcrum, having a lever-arm $f$, to which a link H is connected, by means of which the levers may be operated at will through any convenient connection extended within reach of the driver.

L L are links which connect the levers F and F', respectively, to the lever-arms $E^2$ $E^2$ of the wheel-bearing elements, said links preferably extending between the forks of the wheel-carrying arms, respectively. It will be seen that whenever the driver operates the levers F F' the wheel-bearing element and the wheel may be caused to swing in either direction and to such degree as desired within the limit of the annular recess D³ of the wheel-hub, both wheels receiving identical movement and so being kept parallel with each other whatever be the angle at which they are thus turned with respect to the axle-bar, and it will be observed that in this steering movement no side swing will be given to the carriage-body, because the wheels turn about their point of contact upon the ground.

I do not limit myself to the particular construction of the wheel-bearing element which makes that element consist of a spindle and an extension of the spindle passing outside or encompassing the bearing of the wheel on the spindle; but since this form of bearing has in itself some advantages over one in which the spindle is rigid with the wheel I do claim, specifically, the adaptation of my invention to such a structure. When the form of wheel-bearing comprising the central spindle and the extension is employed, I do not limit myself to making the extension in the form of a bell or cup encompassing the spindle and the wheel-bearing about the spindle; but since this structure has specific advantages in respect to strength and rigidity I make claims for it specifically. Neither do I limit myself to making the wheel-carrying arms in the form of a fork; but inasmuch as this form is necessary in order to give two pivot-bearings, one above and the other below the axle, I claim it specifically.

When the form of wheel-bearing elements comprising the spindle and its extension, as described, is employed and when the extension is for convenience of construction made in a separate piece to be secured rigidly to the spindle, I prefer to secure it in the manner shown and illustrated in Fig. 3, making the spindle with the tapering seat $e$ toward the inner end and making the extension with a correspondingly-tapered aperture, adapting it to be forced onto the tapering seat, the spindle having the inner end threaded and provided with a jam-nut $e^4$, by which the two parts may be forced and held rigidly united.

In Fig. 4 I have shown a modified structure embodying the same generic invention as the other figures. The modification consists in making the hub with a rigid spindle $d$, central with respect to the flange $D^4$, and making the wheel-bearing element a simple sleeve X on the spindle and in the annular recess of the hub between the spindle and the flaring flange $D^4$. The forked wheel-carrying arm strides endwise and is pivoted to the wheel-bearing element, as in the other form.

Inasmuch as the amount of space available in the metal of the wheel-bearing element for rooting or securing the pivots $E^{10}$ is limited by the desirability of making the structure as light as possible and leaving the largest possible space for turning the wheel on the pivots, I prefer to make these pivots integral with the wheel-bearing element, as shown in Figs. 3 and 4, and to provide for getting them into their seats in the fork-arms I make said seats by forming a notch or open recess in the end of the fork-arm and provide a block $C^2$ to occupy the recess and form the inner half of the bearing of the pivot, such block being secured in place by the bolt $c^2$, extending transversely with respect to the axis of the pivots beyond the same through the end of the fork-arm and such block. With this construction it will be seen that the fork-arms can be passed endwise onto the pivots under the heads of the latter and the block $C^2$ afterward inserted and secured, making a perfectly snug bearing free from rattling and rendering it possible to make both the pivots and the fork ends as strong and heavy as the space permits.

I claim—

1. In a carriage-steering mechanism, the combination of a wheel having its hub provided with an annular recess extending in from one side to the plane of tread, the wheel-bearing element, consisting of a spindle having a rigid extension reaching into such annular recess, and the wheel-carrying arm which protrudes into the recess and is pivoted to the spindle extension at a vertical line through the axis in the plane of tread; the wheel-bearing element having a horizontal lever-arm; a lever having its fulcrum rigid with the wheel-carrying arm, and a link connecting said lever to the lever-arm of the wheel-bearing element; and suitable means for operating the first-mentioned lever at will.

2. In a carriage-steering mechanism, the combination of a wheel having its hub provided with an annular recess extending in from one side to the plane of tread, the wheel-bearing element having a central recess by which it is adapted to enter the annular recess and receive the central portion of the hub; a wheel-carrying arm extending into the recess outside the wheel-bearing element, and pivoted to the latter at a vertical line through the axis in the plane of tread; said wheel-bearing element having a horizontally-projecting lever-arm; a lever having its fulcrum rigid with the wheel-carrying arm; a link connecting said lever to the horizontal lever-arm of the wheel-bearing element, and means for operating said lever at will.

3. In a carriage-steering mechanism, a wheel having its hub provided with an annular recess extending in from one side to the plane of tread; the bearing-spindle, having a rigid extension reaching into such annular recess; a wheel-carrying arm having a terminal fork which protrudes into the recess, striding the spindle and its extension endwise, and having its fork-arms pivoted to the extension respectively above and below the spindle, in a vertical line with the axis in the plane of tread, the spindle having a horizontally-projecting arm; a lever having a vertical fulcrum, rigid with the wheel-carrying arm; a link connecting said lever with the spindle lever-arm, such link extending between the fork-arms, and means for operating the vertically-fulcrumed lever at will.

4. In a carriage-steering mechanism, the combination of oppositely-projecting wheel-carrying arms; wheel-bearing elements vertically pivoted to said wheel-carrying arms respectively and axially recessed from the outer ends; wheels having their hubs provided with annular recesses at the inner side extending in to the plane of tread, leaving the central rigid portions adapted to enter respectively the axial recesses in their respective wheel-bearing elements; said wheel-bearing elements having each a horizontally-extending lever-arm at the inner end; levers fulcrumed on the wheel-bearing frame; links connecting them respectively to the lever-arms or the wheel-bearing elements, and a link connecting said levers with each other from side to side of the vehicle.

5. In a carriage-steering mechanism, the combination of a wheel-carrying frame having rigid outwardly-extending wheel-carrying arms; bearing-spindles for the wheels which have rigid extensions springing from their inner ends and returning toward the outer ends; wheels having their hubs provided each with an annular recess at the inner side extending to the plane of tread and adapted to receive the rigid extensions of the spindles when the wheels are suitably mounted on the spindles respectively, said rigid wheel-bearing arms being extended into such recesses respectively, and pivoted to the spindle extensions respectively, each at a vertical line through the axis in the plane of tread; the spindles having horizontally-projecting lever-arms toward the inner end; levers having fulcrums rigid with the wheel-carrying frame; links connecting said levers respectively with the spindle lever-arms; a link connecting the two levers with each other, and means for operating one of said levers at will.

6. In a carriage-steering mechanism having the hub annularly recessed, and the wheel-bearing element extending in such recess and the wheel-carrying arm pivoted to the wheel-bearing element within the recess, the pivots integral with the wheel-bearing element, projecting radially therefrom, the wheel-carrying arm being forked and having pivot-bearings in the ends of the forks, such bearings being formed by recesses in the ends of the fork-arms adapted to receive the pivots, and blocks to close the recesses beyond the pivots, and bolts which secure the same in the recesses.

In testimony whereof I have hereunto set my hand, at Chicago, Illinois, in the presence of two witnesses, this 11th day of September, A. D. 1900.

ROBERT W. THOMPSON.

In presence of—
  H. W. JEFFERY,
  THOS. B. JEFFERY.